US011023364B2

(12) United States Patent
Krocek et al.

(10) Patent No.: US 11,023,364 B2
(45) Date of Patent: Jun. 1, 2021

(54) METHOD AND SYSTEM FOR AUTOMATING THE PROCESS OF TESTING OF SOFTWARE APPLICATIONS

(71) Applicant: Suitest S.R.O., Prague (CZ)

(72) Inventors: Lukas Krocek, Prague (CZ); Taras Perevorskyy, Prague (CZ); Mirko Nedeljkovic, Prague (CZ)

(73) Assignee: SUITEST S.R.O., Prague (CZ)

( * ) Notice: Subject to any disclaimer, the term of this patent is extended or adjusted under 35 U.S.C. 154(b) by 0 days.

(21) Appl. No.: 15/573,546

(22) PCT Filed: May 11, 2016

(86) PCT No.: PCT/EP2016/060586
§ 371 (c)(1),
(2) Date: Nov. 13, 2017

(87) PCT Pub. No.: WO2016/180894
PCT Pub. Date: Nov. 17, 2016

(65) Prior Publication Data
US 2018/0121340 A1    May 3, 2018

Related U.S. Application Data

(60) Provisional application No. 62/160,012, filed on May 12, 2015.

(51) Int. Cl.
*G06F 9/44*      (2018.01)
*G06F 9/445*    (2018.01)
*G06F 11/36*    (2006.01)

(52) U.S. Cl.
CPC ...... *G06F 11/3688* (2013.01); *G06F 11/3664* (2013.01); *G06F 11/3672* (2013.01); *G06F 11/3692* (2013.01)

(58) Field of Classification Search
CPC ............. G06F 11/3688; G06F 11/3664; G06F 11/3672; G06F 11/3692; H04N 7/00; H04N 17/00; H04N 21/20
See application file for complete search history.

(56) References Cited

U.S. PATENT DOCUMENTS 5,835,717 A * 11/1998 Karlton ............. H04N 7/17318
                                                                 725/46
7,634,787 B1 * 12/2009 Gebhardt ............... H04N 7/165
                                                                 709/202
(Continued)

FOREIGN PATENT DOCUMENTS

EP          2725494        4/2014
WO    WO2006116120    11/2006

OTHER PUBLICATIONS

Daniel Thommes, RemoteUI: A High-Performance Remote User Interface System for Mobile, 2012, pp. 1094-1101. https://ieeexplore.ieee.org/stamp/stamp.jsp?tp=&arnumber=6311361 (Year: 2012).*
(Continued)

*Primary Examiner* — Mongbao Nguyen
(74) *Attorney, Agent, or Firm* — Alix, Yale & Ristas, LLP (57) ABSTRACT

The invention relates to a method and a system for testing interactive applications on at least one TV device according to at least one test scenario. The test scenario is run and monitored by a test driver system separate from the at least one TV device, wherein the test scenario comprises a series of user interaction steps and at least one target state of the application and/or the at least one TV device to be achieved after a specified user interaction step, the method comprising the steps of: a. integrating a test definition helper library into the interactive application, wherein the test definition helper library is configured to obtain information on the state of the interactive application and/or the at least one TV device; b.
(Continued)

providing the modified interactive application to the at least one TV device; c. running the at least one test scenario, wherein the test driver system non-transparently performs the series of user interaction steps on the at least one TV device; and d. comparing the information on the state of the interactive application and/or the at least one TV device obtained by the test definition helper library with the at least one target state after the specified user interaction step.

19 Claims, 4 Drawing Sheets

(56) References Cited

U.S. PATENT DOCUMENTS

| | | | | |
|---|---|---|---|---|
| 8,185,877 | B1* | 5/2012 | Colcord | G06F 11/3692 717/127 |
| 9,026,853 | B2* | 5/2015 | Zemer | G06F 11/3684 714/28 |
| 9,075,616 | B2* | 7/2015 | Duggal | G06F 8/35 |
| 9,229,846 | B1* | 1/2016 | Budhai | G06F 11/3624 |
| 9,268,668 | B1* | 2/2016 | Lachwani | H04L 43/50 |
| 9,268,670 | B1* | 2/2016 | Lachwani | H04L 43/50 |
| 9,274,935 | B1* | 3/2016 | Lachwani | G06F 11/3688 |
| 9,761,274 | B2* | 9/2017 | Delpuch | G11B 27/005 |
| 9,886,374 | B1* | 2/2018 | Kuo | G06F 11/3692 |
| 2005/0091690 | A1* | 4/2005 | Delpuch | G11B 27/005 725/88 |
| 2009/0307763 | A1* | 12/2009 | Rawlins | G06F 9/44505 726/5 |
| 2010/0153087 | A1* | 6/2010 | Kirtkow | G06F 8/30 703/21 |
| 2010/0153780 | A1* | 6/2010 | Kirtkow | G06F 11/3684 714/37 |
| 2011/0131551 | A1* | 6/2011 | Amichai | G06F 11/3668 717/125 |
| 2011/0145653 | A1* | 6/2011 | Broadfoot | G06F 11/3604 714/38.1 |
| 2012/0011439 | A1* | 1/2012 | Karn | G06F 11/3414 715/704 |
| 2012/0222015 | A1* | 8/2012 | Bennett | G06F 21/6218 717/127 |
| 2013/0007520 | A1* | 1/2013 | Giammarresi | G06F 11/2294 714/32 |
| 2013/0117731 | A1* | 5/2013 | LeSuer | G06F 11/3672 717/125 |
| 2013/0346950 | A1* | 12/2013 | Horovitz | G06F 11/3692 717/128 |
| 2014/0047275 | A1* | 2/2014 | Eddington | G06F 11/0766 714/37 |
| 2014/0047417 | A1* | 2/2014 | Kaasila | H04L 43/14 717/135 |
| 2014/0059521 | A1* | 2/2014 | Voliter | G06F 9/45516 717/125 |
| 2014/0101640 | A1* | 4/2014 | Romdhane | G06F 11/3684 717/125 |
| 2014/0123111 | A1* | 5/2014 | Lee | G06F 11/3672 717/124 |
| 2014/0181849 | A1* | 6/2014 | Casey | H04N 21/442 725/14 |
| 2015/0046909 | A1* | 2/2015 | Ligman | G06F 11/3688 717/131 |
| 2015/0052503 | A1* | 2/2015 | Ligman | G06F 11/3664 717/125 |
| 2015/0095891 | A1* | 4/2015 | Beskrovny | G06F 11/3672 717/125 |
| 2015/0105878 | A1* | 4/2015 | Jones | G06F 9/44505 700/83 |
| 2015/0212927 | A1* | 7/2015 | N'Gum | G06F 11/3664 717/125 |
| 2015/0264423 | A1* | 9/2015 | Torgemane | G06F 8/30 715/719 |
| 2016/0162389 | A1* | 6/2016 | Lachwani | G06F 11/3664 714/38.14 |
| 2016/0179658 | A1* | 6/2016 | Avery | G06F 3/0481 717/135 |
| 2016/0191349 | A1* | 6/2016 | Buege | H04L 41/5038 709/224 |
| 2017/0039124 | A1* | 2/2017 | Kiel | G06F 11/3636 |
| 2017/0147480 | A1* | 5/2017 | Lachwani | G06F 11/3684 |

OTHER PUBLICATIONS

Tarkan Tekcan, User-driven Automatic Test-case Generation for DTV/STB Reliable Functional Verification, 2012, pp. 587-594. https://ieeexplore.ieee.org/stamp/stamp.jsp?tp=&arnumber=6227464 (Year: 2012).*
Faustino Sanchez, Interconnected platform for testing services, applications and products based on the DVB-MHP standard, 2009, pp. 1-5. https://ieeexplore.ieee.org/stamp/stamp.jsp?tp=&arnumber=5133748 (Year: 2009).*
Binbin Qu, A Developed Dynamic Environment Fault Injection Tool for Component Security Testing, 2009, pp. 417-422. https://ieeexplore.ieee.org/stamp/stamp.jsp?tp=&arnumber=5325339 (Year: 2009).*
Ron Yazma, Instrument, Hardware and Software Simulation in a Test System, 2013, pages https://ieeexplore.ieee.org/stamp/stamp.jsp?tp=&arnumber=6645081 (Year: 2013).*
Branimir Kovacevic, Scenario-Based Set-Top Box testing, 2014, pp. 1087-1089. https://ieeexplore.ieee.org/stamp/stamp.jsp?tp=&arnumber=7034596 (Year: 2014).*
Search Report.

* cited by examiner

METHOD AND SYSTEM FOR AUTOMATING THE PROCESS OF TESTING OF SOFTWARE APPLICATIONS

BACKGROUND

The present invention relates to a method and a system for testing interactive applications on at least one TV device according to at least one test scenario.

Connected TV devices are rapidly gaining popularity these days and a multitude of interactive applications for TV devices already exist. Before releasing to production every interactive application must be properly tested to ensure that all execution paths function properly, the edge cases are covered and the application is fully compatible with all TV devices on the target platform. Testing interactive applications manually has a number of obvious drawbacks, among other error proneness due to human mistakes, long time-to-market, increased costs for QA team and testing devices, etc. Known automatic testing approaches, such as described in U.S. Pat. No. 8,185,877 B1, are not capable to be used for the testing of interactive applications on TV devices. The testing of TV devices therefore requires highly skilled technicians, workflow and development cycle changes, and pose a number of conditions and restrictions on the interactive application development style.

SUMMARY AND DEFINITIONS

In view of this, a method and a system are provided for testing interactive applications on TV devices which provides provide a simple and user friendly way of defining and performing test scenarios.

The test scenario is run and monitored by a test driver system separate from the at least one TV device. The test scenario comprises a series of user interaction steps and at least one target state of the application and/or the at least one TV device to be achieved after a specified user interaction step. The method comprises the further steps of:
a. integrating a test definition helper library into the interactive application, wherein the test definition helper library is configured to obtain information on the state of the interactive application and/or the at least one TV device;
b. providing the modified interactive application to the at least one TV device;
c. running the at least one test scenario, wherein the test driver system non-transparently performs the series of user interaction steps on the at least one TV device; and
d. comparing the information on the state of the interactive application and/or the at least one TV device obtained by the test definition helper library with the at least one target state after the specified user interaction step.

First of all, a few terms used within the present invention are explained. Hereinafter the term "TV device" is used to refer to a television or to a device being used in connection with a television in order to display image and/or video content on the television. Examples of such a TV device include but are not limited to: Television sets, Set Top Boxes, or other devices having a capability to broadcast or transmit image and/or video content to a TV, such as PC sticks, gaming consoles, broadcasting devices, multimedia devices, streaming devices, phones, tablets and other mobile devices or other devices which possess a screen beaming capability.

Most of the present TV device platforms support interactive applications which may be built using either common web technologies or SDKs provided by device manufacturers or custom software. The term "interactive application" denotes any kind of application which can be run on a TV device. Interactive applications within the meaning of the present invention particularly comprise applications installable from the device manufacturer's portal and applications that are complementing a TV channel. Applications from the first group are in the following referred to as SmartTV applications. Applications from the second group use different technology standards in different countries, wherein the prevailing technology standard is HbbTV (Hybrid broadcast/broadband TV). Applications from the second group are referred to as broadcast applications in the following. It will be appreciated that the present invention supports testing of both broadcast applications and SmartTV applications.

Within the present invention, the term "target state" denotes a state of the interactive application and/or the TV device which is expected after a corresponding specified user interaction step in case the interactive application and/or the TV device functions properly.

The test driver system (TDS) runs the test scenario in a way, which is non-transparent to the application and/or the TV device being tested. The term non-transparent within this context means that the application and/or the TV device on which the user interaction step or series of user interaction steps is performed is not able to distinguish between a user interaction step coming from the TDS and a regular (i.e. manual) user input signal coming from an end-user.

The TDHL is integrated into the interactive application. Within the present invention the term "modified interactive application" is used in order to denote an interactive application comprising the test definition helper library.

It will be appreciated that the integration of the TDHL into an application is a very simple process that usually requires no more than 1-4 lines of code. For example, in case of a TV application built using web technologies the TDHL together with a unique application id (UAID) may be integrated by adding a script tag to every HTML page of the application. In case of applications built with other technologies then web, this generally means to include a library and execute a predefined initialization call for passing over the UAID. It will be appreciated that TDHL is a very carefully crafted software that usually has none or very insignificant impact on the overall functioning of the application. Since TDHL poses generally no conditions on the application, developers do not have to make any adjustments to the application code—the development process may simply ignore the presence of TDHL. It will be appreciated, that in some embodiments the TDS may be implemented to inject the TDHL with UAID into an application automatically without a manual intervention from the developer.

Just before the developer signs the application over for testing he injects TDHL into it. TDHL may create a persistent data connection between the device on which the app is running and the TDS. However, usually a persistent data connection is not required at all times. In some embodiments TDHL may be configured to collect test related results continuously and deliver them all at once to TDS after data connection becomes available. It preferably acts as a man-in-the-middle between the users input and the application. During the runtime TDHL may maintain a persistent or non-persistent connection to TDS to provide information about the application runtime internals in real time. TDS can instruct it to perform inspection of various UI elements of the application as well as its non-visual properties in order to perform a test.

One of the main ideas is to integrate the test definition helper library into the interactive application, wherein the test definition helper library is configured to obtain information on the state of the interactive application and/or the at least one TV device. Thus, the present invention disclosure suggests to modify the interactive application to be tested. The functionality to obtain information on the state of the interactive application and/or the at least one TV device is directly provided to the interactive application. It is not necessary to monitor the state of the interactive application from "outside" of the interactive application, for instance by means of capturing and analyzing the display output of the application directed to a TV device. Rather, the relevant information is directly obtained by the TDHL being integrated into the interactive application and may be forwarded to the test driver system for further analysis. This considerably simplifies the testing process, as TDS may readily be configured to supervise test execution on each device, collect results from each device and compile a comprehensive report.

A further advantage of the present invention relates to the TDS being configured to non-transparently perform the series of user interaction steps on the at least one TV device. Due to the non-transparency the TV device cannot distinguish between user interaction steps generated by the TDS and a regular user input signal generated by the end user. This is crucial in order to provide a realistic test scenario which does not differ from a corresponding "real operating scenario" of the TV device.

An effort has been made to make automated testing of TV devices more approachable and understandable for individuals without requiring any special technical knowledge. With respect to the testing process itself it will be appreciated, that the person performing the test does not need to know the internals of the application intimately. The test operator is only expected to know the applications specification, i.e. expected behavior and response to a particular user action. The test operator may build a number of test cases with the help of an optionally provided graphical user interface (GUI) on any TV device currently at his disposal. After the test case is thus prepared it can be scheduled for unattended execution on a number of TV devices that the application is targeting.

In a preferred embodiment the data obtained by the test definition helper library is transmitted to the test driver system, wherein the comparison in step d. is preferably performed by the test driver system. Thus, the information on the application and TV device state can be effectively analyzed and further processed.

Preferably, the information on the state of the interactive application and/or the at least one TV device obtained by the test definition helper library comprises at least one of the following:
 a TV device identification value,
 information on runtime objects of the interactive application,
 information on view objects of the interactive application,
 information on data traffic caused by the interactive application,
 console output of the interactive application,
 operating system runtime changes and/or
 shared memory status.

Obtaining one or more of the above noted data allows to generate an accurate analysis on the state of the interactive application and/or the TV device.

It is furthermore preferred that the test driver system comprises a translation module to translate the user interaction steps of the test scenario into user input signals adapted to each of the at least one TV device.

The interactive TV application may be a SmartTV application or a broadcast application, wherein the test driver system is preferably configured to automatically install or provide the modified interactive application on the at least one TV device. The idea to use a test driver system being capable to automatically provide the modified interactive application to the at least one TV device is particularly beneficial, as it considerably simplifies the test preparation process. In particular, it is not required that each TV device is individually attended to in order to install the modified application. Thus time and costs are saved.

In case the interactive application is a broadcast application, it is preferred that the test driver system provides the at least one TV device with a television signal, preferably with a DVB-signal, wherein the television signal is preferably adapted to provide the modified interactive application to the at least one TV device. Herein the term DVB-signal denotes signals being configured to deliver digital television, such as, in particular, DVB-T, DVB-T2, DVB-S, DVB-S2, DVB-C, DVB-C2, etc. Preferably the DVB-signal comprises an application information table (AIT). With this idea, a particularly beneficial method is provided for automatically providing the modified interactive application to the at least one TV device. Within this embodiment it is not necessary to perform any modifications or adaptions on the at least one TV device. It is simply sufficient to set the at least one TV device into its usual operation mode in which it receives the television signal provided by the test driver system, wherein the modified interactive application is provided by the television signal.

In a preferred embodiment the test driver system comprises an infrared emitter, a wireless radio wave transmitter and/or a network connection module for non-transparently performing the series of user interaction steps on the at least one TV device. Due to this measure typical user interaction steps can be carried out by the test driver system. The wireless radio wave transmitter may, for instance, use the Bluetooth® standard. If, for example, the interactive application running on the TV device is controlled by HTTP Api calls, the network connection module may be adapted to send such HTTP Api calls in order to non-transparently perform the series of user interaction steps. If, as a further example, the TV device is a PC-stick navigable by a standard keyboard, the network connection module may be configured to send emulated keyboard signals to the PC-stick in order to non-transparently perform the series of user interaction steps.

The test driver system may be configured to intercept network traffic of the at least one TV device to provide predefined versions of network resources requested by the interactive TV application.

Subject of the present disclosure is furthermore a method for defining a test scenario for use in a testing method as described above, wherein the method uses a reference TV device and comprises the following steps:
 a. integrating a test definition helper library into the interactive application, wherein the test definition helper library is configured to obtain information on the state of the interactive application and/or the at least one TV device;

b. providing the modified interactive application to a reference TV device;
c. providing a manual user input signal to the reference TV device, wherein the test definition helper library and/or the test driver system is configured to monitor the manual user input signal;
d. monitoring the information on the state of the interactive application and/or the reference TV device subsequent to the manual user input signal provided in step c.;
e. defining a specified user interaction step and a corresponding target state of a test scenario, wherein the specified user interaction step is based on the monitored manual user input signal and wherein the target state is based on the monitored state of the interactive application and/or the reference TV device obtained in step d.

The reference TV device preferably is a TV device on which the interactive application is already tested, wherein the interactive application functions properly on the reference TV device. The reference TV device can, thus, be used to define the target state of the test scenario and the corresponding user interaction steps. The inventive method allows the definition of the test scenario in an efficient and straightforward way, as simply a manual user input signal can be directed at the reference TV device, wherein the manual user input signal and the target state of the interactive application and/or the TV device is automatically monitored and used to define the test scenario.

Subject of the present disclosure is furthermore a test system being adapted to perform the testing method as described above, wherein the system comprises a test driver system and at least one TV device. The at least one TV device comprises the interactive application, wherein the test definition helper library is integrated into the interactive application. The test definition helper library is configured to obtain information on the state of the interactive application and/or the at least one TV device. Furthermore, the TDS is adapted to run the at least one test scenario by non-transparently performing the series of user interaction steps on the at least one TV device. The system is furthermore adapted to compare the information on the state of the interactive application and/or the at least one TV device obtained by the test definition helper library with the at least one target state after the specified user interaction step.

Preferably, the test driver system is adapted to carry out the comparison.

In a preferable embodiment, the test driver system comprises a translation module configured to translate the user interaction steps of the test scenario into user input signals adapted to each of the at least one TV device.

It is furthermore preferred that the test driver system comprises an executive unit configured to emit a user input signal adapted to each of the at least one TV device, wherein the executive unit preferably comprises an infrared emitter, a wireless radio wave transmitter and/or a network connection module. Preferably, an executive unit is provided for each of the at least one TV devices.

In another embodiment, the test driver system furthermore comprises a learning unit configured to receive a manual user input signal adapted to the at least one TV device, wherein the test driver system comprises a conversion module configured to convert the manual user input signal into a user interaction step of the test scenario.

The test driver system may comprise a broadcasting unit configured to automatically install or provide the modified interactive application on the at least one TV device, wherein the interactive application preferably is a broadcast application, wherein the broadcasting unit preferably provides the at least one TV device with a television signal, preferably a DVB-signal, wherein the television signal is preferably adapted to provide the modified interactive application to the at least one TV device.

The system may be further developed by means of the features which have been described in relation with the methods.

It will be appreciated that it is generally possible to apply the idea of the present disclosure to any software application independently of its implementation technology or target platform. However, the present independent claims are explicitly restricted to the testing of interactive applications running on TV devices.

BRIEF DESCRIPTION OF THE DRAWINGS

The features, objects and advantages of the invention will become further apparent by the following exemplary description of preferred embodiments in conjunction with the accompanying drawings, which show.

DETAILED DESCRIPTION

Figure 1:
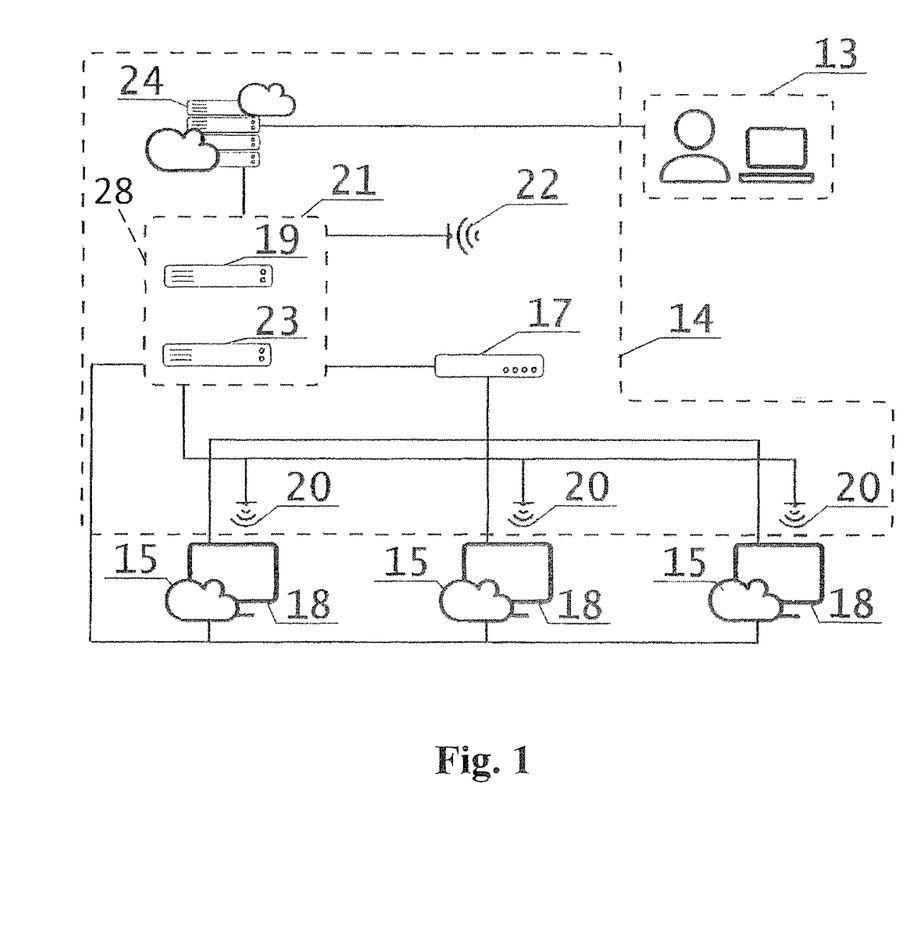
FIG. 1 is a schematic overview illustrating an exemplary embodiment.

An exemplary embodiment of the inventive system is illustrated in FIG. 1. The main components of the system are a test driver system (TDS) 14 and a test definition helper library (TDHL) 15 which is integrated into an interactive application running on TV devices 18.

The TDS 14 comprises a central server 24, a control unit 21, an executive unit 20, a translation unit 19, a broadcasting unit 17, a learning unit 22, and a conversion module 23. A graphical user interface (GUI) 13 is running on the central server 24 and may be accessed via the internet. The local arrangement of the elements of TDS 14 shown in FIG. 1 is an exemplary arrangement only and does not imply any restrictions on the actual location of these elements.

Figure 2:
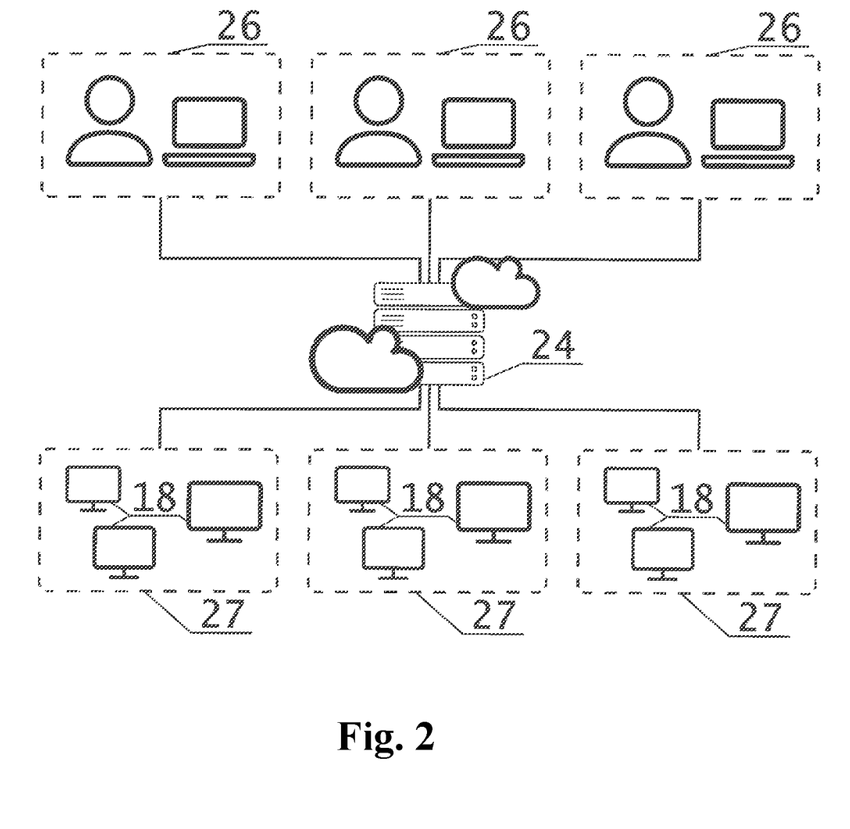
FIG. 2 is a schematic overview of a second embodiment illustrating the purpose of the central server.

The central server 24 is a network server that hosts all of the TDS 14 software. The central server 24 may be distributed on different physical computer machines that may be located in different geographical locations. The central server 24 is connected to the control unit 21 which controls the TV devices 18. Control unit 21 and TV devices 18 are located in the same IP network. As illustrated in FIG. 2, the central server 24 may be connected to different groups 27 of TV devices 18, wherein each group is controlled by a separate control device (not shown), and wherein each group 27 and associated control device is part of a separate IP network. Several test operators 26 may connect with the central server 24 by means of user accounts and simultaneously perform test operations on the groups 27 of TV devices 18.

Referring back to FIG. 1, the control unit 21 controls all TV devices 18 and reports to the central server 24. It creates and maintains a persistent connection to the central server 24. After pairing with user account, it can listen to commands from central server 24 and forward them to control unit 21 or other control units being located on different IP networks, or collect local metrics. When used in tandem with routing unit (explained below), it can provide http proxy capable of translating domains and injecting testing scripts. The control unit 21 may be a microcomputer such as Raspberry Pi®. Nevertheless any computing device with a CPU 28 architecture based on, for example, ARM®, x86 or AMD64® and running Linux®, FreeBSD® or Windows® can be deployed as control unit. Those skilled in the art will appreciate, that any modern home PC is suitable for becoming a control unit 21.

The broadcasting unit 17 is used to broadcast a DVB-signal including an application information table (AIT), which is received by the TV devices 18. The TV devices 18 are enabled to run broadcast applications and are tuned to the DVB-signal broadcasted by the broadcasting unit 17. The DVB-signal comprises an interactive application into which the TDHL is integrated. The interactive application comprising the TDHL automatically starts on the TV devices 18 due to an autostart record in the AIT of the DVB-signal. Those skilled in the art will appreciate that there is at least one other way to achieve this by using a static AIT with a specially crafted autostart application that connects to TDS 14 and then itself starts the target application on behalf of TDS 14. The broadcasting unit may be a cable/terrestrial modulator, such as a DekTec DTU-215° or any other device with capabilities as described above.

The TDHL 15 is a software component being able to inspect the runtime of the interactive application and/or the view objects of the application, listen, collect and/or transmit to TDS the network traffic made by the application, listen and/or collect and/or transmit to TDS the console output of the application, perform screenshots or video capture of the renderings on the devices screen and/or transmit them to TDS 14. In some embodiments the TDHL 15 may utilize available platform tools to perform inspections and measurements outside the application being tested, for example inspect the shared memory or the system internals. TDHL 15 is written, compiled and/or transpiled to the language supported by the platform of the interactive application being tested. For example, the TDHL 15 for a broadcast application is written, compiled and/or transpiled to JavaScript. Another feature of the TDHL 15 is, that it poses no restriction on neither the TV device 18 nor the interactive application running on that device.

GUI 13 is a web based graphical user interface application but may in other embodiments be any other type of application capable of running on a personal computer or similar device. GUI 13 serves for defining user interaction steps as well as complete test scenarios. GUI 13 communicates with the control unit 21 of TDS 14 via central server 24. GUI 13 usually does not communicate with other components of the system directly. GUI 13 may offer means for performing advanced data analysis based on historical test executions as well as a statistical overview. The GUI 13 is a graphical user interface application and can be used for creating and managing test cases, viewing test results and reports, viewing test history, managing devices currently in the system or adding new device, sharing devices with other users, managing app configuration, automatic test creation based on previous tests and machine learning algorithms.

It allows for creating tests in the natural test language as described below. In some embodiments GUI 13 may also allow adding tests of different type then the above, for example unit tests or integration tests. GUI 13 interacts with TDS 14 directly. In some embodiments GUI 13 may help the test operator to create a test condition automatically. Test operator opens GUI 13 and opens the application to be tested on the TV devices 18. Test operator presses a "Select view element" button in GUI 13 which triggers the element selection mode. In element selection mode the GUI 13 makes it possible for the test operator to select a particular view element and automatically retrieve its current properties. Provided that GUI 13 is launched on a personal computer or similar device, in some embodiments pressing the "Select view element" could cause pairing of the movements of the mouse attached to PC, on which the GUI 13 is running, with the movements of a visual pointer on the TV device 18. Clicking the mouse button can retrieve the properties of the element currently being pointed to with said pointer. In some embodiments the test operator may be given an option to specify a selector string that is used to identify the view element within the application's view tree. Such string may be a CSS or XPath selector string if the application being tested is HTML based. Alternatively it may be of any format recognizable by either the TDHL 15 or the underlying platform.

GUI 13 may also provide the user with a repository of the view element either preselected automatically by TDHL 15 or saved manually by the test operator. The thus selected view element may be then highlighted in the application as to provide a better orientation for the test operator. Those skilled in the art will appreciate that there are a number of other ways of selecting a particular view element.

GUI 13 may furthermore provide means of historical and comparative analysis of the test(s). In particular, it may offer tools to either fully or partially automatically determine at which point the application started failing and what was the cause for that failure. In some embodiments GUI 13 may generate textual and graphical reports and allow for a deeper drilldown into the test results and application internals.

GUI 13 may also serve as a tool for application debugging and/or development. For example GUI 13 may provide tools of launching an application while watching internet traffic caused by that application as well as its console output. GUI 13 may report errors or potential errors in the application fully automatically by merely letting the TDHL 15 perform the inspection routine of the application.

In some embodiments GUI 13 may also provide means for running the test iteratively (step by step) or executing it all at once on one or more TV devices. GUI 13 may also provide means of scheduling the test execution on one or more TV devices either remote or local.

In some embodiments GUI 13 may also provide means of synchronizing the test progress with the application state on the device. Those skilled in the art will appreciate that the test (any UI test) is in the essence a sequence of the user input steps that modify the application state. The GUI 13 may be able to warn the test operator whether or not the state of the application on the TV device 18 corresponds to the test progress inside the GUI 13.

After the definition of a user interaction step by means of GUI 13, the translation module 19 of TDS 14 translates the user interaction step into user input signals adapted to each of the at least one TV device. The user input signals are forwarded to the executive units 20 each of which comprise infrared emitters. The infrared emitters are able to emit infrared waves of length 940 nm which can be received by TV devices 18. The user input signals are sent to TV devices 18 by means of the infrared emitters. The state of the interactive application and/or the TV devices 18 is changed by the user input signals. In other embodiments executive units 20 may additionally or alternatively comprise a Bluetooth® transmitter and/or a network connection module configured to emit the user input signals to the TV devices 18.

The executive units 20 further comprise an interface capable of connecting to control unit 21 via an interface such as USB, Ethernet, Wi-Fi, Bluetooth®.

It will be appreciated by the person skilled in the art, that the executive unit 20 may require additional modules or may be just a software. For example, if the TV device is controlled by HTTP Api calls, the executive unit 20 may be a piece of software running on the control unit 21. Another example: if a device is navigable by a standard keyboard, the control unit 21 may include a keyboard emulation controller. Another example: if the remote control of the TV device is based on the Bluetooth® standard, the present invention may use an executive unit 20 equipped with a programmable Bluetooth® interface.

Test Language

Each test consists of an arbitrary amount of steps. Each step can be expressed in a synthetic yet human readable language. The test aims to model the actual behavior of an actual tester during a QA process. Supposing that MyApp is an app that responds to the navigational cursor buttons. Here is an example of a navigational test with 7 steps:

1. Open MyApp or fail with a timeout after 5000 ms.
2. Press button "DOWN" once.
3. Press button "RIGHT" 3 times.
4. If "video teaser" does not exist then fail test
5. If "video teaser" background color is not equal to rgba(0, 0, 0, 1); then fail test
6. Press button "OK" once.
7. Wait until element "video player" appears or fail with a timeout after 5000 ms.

As is obvious from the test definition, this exemplary simple test aims to open the app, execute 4 button presses, verify the presence of the element "video teaser" and consequently check if it has correct background color. Then OK button will be pressed and the video player will be expected to appear.

It will be appreciated that this test definition is applicable to any interactive application on any TV device platform. The only assumption that this test makes is that the application responds to navigational buttons. Some embodiments of the inventive system may formulate navigational clauses applicable to cover navigational specifics of a particular platform.

The GUI 13 makes it generally possible to define tests exactly like the one example above. Operator can define each step by selecting options that modify the step from a very general to a very narrow one. For example to create a step that holds a test condition:

1. Operator presses a button "Add condition step".
2. A following step is inserted into the test case: If [condition] then [continue test].
3. Operator clicks on the [condition] and gets to pick the type of the condition out of the suitable options. The exact selection of options varies based on the platform and the type of application being tested. It will be appreciated however that the available conditions are thus that allow describing any present state of the application. For example for a web based application the list would be not limited to the following: [view element, videoplayer, page location, variable value]. For the sake of the example suppose the operator selects the value of [videoplayer] for [condition].
4. The step is transformed like so: if [videoplayer] [has] [property] then [continue test].
5. Operator can expand the [property] part in the same way as he expanded the [condition] part in the step 3. The [has] part can also be changed if necessary. Suppose that operator selects property "status" for [property]
6. The step is transformed like so: if [videoplayer] [has] [status] [equal to] [stopped] then [continue test]. The GUI tries to autocomplete as much as possible in order to reduce the effort of the operator, so it would fill out the "playing" as the value of the current state of the background color. With step 6 the condition is completely expanded and the operator can proceed to the next step in the test case.

The invention gives operator the ability to define, for instance, that the step should be considered successful, if the condition result is true. This is controlled by the [continue test] part. Operator is able to change this to one of continue test, fail test, stop test, issue a warning.

Test Definition

Every test case in the exemplary system may be based on a single rule. Assuming that the application's content data remain unchanged, arbitrary fixed sequence of user interaction with the application must cause the application to enter an identical state on every target device after execution. I.e. if the user does the same thing to the application it should give him back the same result.

The process of test definition assumes that the test operator has a "reference TV device" at his disposal. For instance, one of the TV devices 18 may be a reference TV device. Alternatively, the reference device may be connected to the system in addition to TV devices 18. On the reference TV device, the application to be tested functions without error. Having at least one such device is generally necessary since without attachment to the application state a test step is of no value.

It will be appreciated that the particular test step is able to be synchronized with the corresponding state of the application and/or the TV device 18. It will be appreciated that the GUI 13 makes it possible for the test operator to fast forward or rewind to any test step and to view the application state on the TV device 18. This can be a very important feature since the test operator is editing the test case based on the captured state of the application which is the only reliable source of information for the test step.

The exemplary system furthermore allows for recording manual user input signals directed to the application and/or the reference TV device 18 as well as the state of the application and/or the TV device 18 after each interaction. In other words, a test case can be recorded by simply using the application in the same way as the end user would. To start recording the test operator opens the application containing the TDHL 15 on the reference TV device, logs into his account at GUI 13 and presses "Start recording test" button in GUI 13. This activates the watch function in TDHL 15 which intercepts every manual user input signal before it is passed over to the application and inspects the application state after this interaction. TDHL 15 sends its findings to TDS 14 which in turn forwards it to GUI 13. As a result of this a new step of the test case appears instantaneously inside of the GUI 13.

In some cases the TDHL 15 may not be capable of intercepting manual user input signals. The exemplary TDS 14 therefore furthermore comprises a learning unit 22 configured to receive manual user input signals. Such a manual user input signal may be, for instance, an optical signal (such as an infrared signal sent by a conventional remote control), an HTTP Api call, or a standard keyboard input signal. The received signals are forwarded to a conversion module 23 which converts the signals into a corresponding user interaction step. In addition, subsequent to each manual user input, the state of the application is monitored by the TDHL 15 and forwarded to the control unit 21. By combining the user interaction step with the monitored state of the application, a test scenario can be created.

The learning unit 22 is an electronic device which may comprise the following further elements:
- an interface capable of connecting to control unit 21 via either of USB, Ethernet, Wi-Fi, Bluetooth® or any other interface,
- an optical sensor, which can be complemented by either a sensor measuring carrier frequency, or an array of sensors each filtering different carrier spectrum,
- a microcontroller for processing the data captured by the optical sensor.

As mentioned above, a particular TV device 18 may feature a method of control alternative to the traditional remote control. For example, the TV device 18 may be able to respond to API commands sent via HTTP. The learning device 22 may therefore be capable of receiving those alternative control methods as well. Every control unit 21 can utilize one or more learning units 22 in a particular group of devices.

Additionally, the TDHL 15 of the exemplary embodiment logs other events that emerge during the test recording session: data traffic, operating system runtime changes, memory status, etc. To achieve maximum precision TDHL 15 filters out events that might not have been caused by user interactions with the app or events that happen too often (hundreds of time per second). This events may be logged as a separate step in the recorded test case.

Test operator can delete or modify parts of the recording to further strengthen or broaden the test. Test operator can also define a reference element manually by a direct selection.

It will be appreciated that the exemplary embodiment employs predictive modelling algorithms and pattern recognition to offer automatic test creation based on static input parameters. For example, tagging a particular element of the application will cause the TDHL 15 to find its "siblings" that is elements with similar properties, repeat the action originally defined for the tagged element adapted to the context of the sibling and undertake an intelligent guess on whether or not the result of the operation is correct. Another example: If a certain sequence of the user input has caused the application to fail once, the TDHL 15 will be able to detect situations when it is likely that the application would fail again were it subjected to the same or similar user input sequence. In such cases TDHL 15 calculates the statistical variation determining the most likely failure scenario. Consequently and without supervision TDHL 15 generates a comprehensive test execution plan to cover the likely-to-fail user input scenarios.

It will be appreciated that the exemplary embodiment is able to control execution of tests different from the described above. For instance the system is able to execute and collect results of unit tests, integration tests or other types of tests commonly created by the software developers/QA personnel.

Test Execution

While the testing principle is the same for every platform, the actual test execution differs for every platform and the complexity of the system governing the process varies greatly. The TDS 14 component of the exemplary embodiment encapsulates the platform differences providing a unified application programming interface (API) for controlling an arbitrary amount of TV devices 18 of a particular platform in parallel. The following methods can be carried out by the exemplary TDS 15: install application, launch application, send user input (key event, mouse event, touch event, other HID event), destroy application, recover from application failure, report application state, restart/reinitialize device, report component state, report runtime state, run a shell or platform specific command.

In the topic of test execution the TDS generally distinguishes between the reference TV device (used for test definition) and a test device (used for unattended execution of a ready test case). The function of a reference TV device is described above. It will be appreciated that the API methods work with arbitrary amount of test TV devices 18 at the same time and that the devices can join and leave the device pool at any point of time without influencing the operations of TDS 14. It will be appreciated that the present disclosure allows for TV devices 18 to freely participate in the test device pool. A cluster of test devices, e.g. on the same (IP) network is also called a "device zoo".

The device zoo comprising TV devices 18 is controlled by control unit 21 which is a dedicated computer machine with preinstalled software that is part of TDS 14. In this case, the control unit 21 is also called zoo master. The zoo master is on the same network as other zoo members. A Raspberry Pi® may, for example, be utilized as a zoo master. Depending on the platform, additional hardware and software may be required to manage applications on the members of the zoo. Furthermore the system may be able to utilize devices belonging to the end users for executing tests when not in use by the end user.

Further Details of the Exemplary Embodiments

Hereinafter the term "emulator" shall refer to a computer software that emulates the behavior of a certain TV device. It shall be known to the persons skilled in the art, that it is a common practice of a hardware manufacturer to release a virtual machine containing software identical to that installed on the TV device. The "emulator" shall refer to such a virtual machine.

Hereinafter the term "platform" refers to the software preinstalled on the device at the point of leaving the manufacturing premises as well as modified versions of such software. This includes for example the device firmware, the operating system or a special set of applications installed on the device. A single physical device may have one or multiple platforms installed and supported.

TV devices 18 of different types, situated in different geographic locations and owned by different users or entities are supported.

Figure 3:
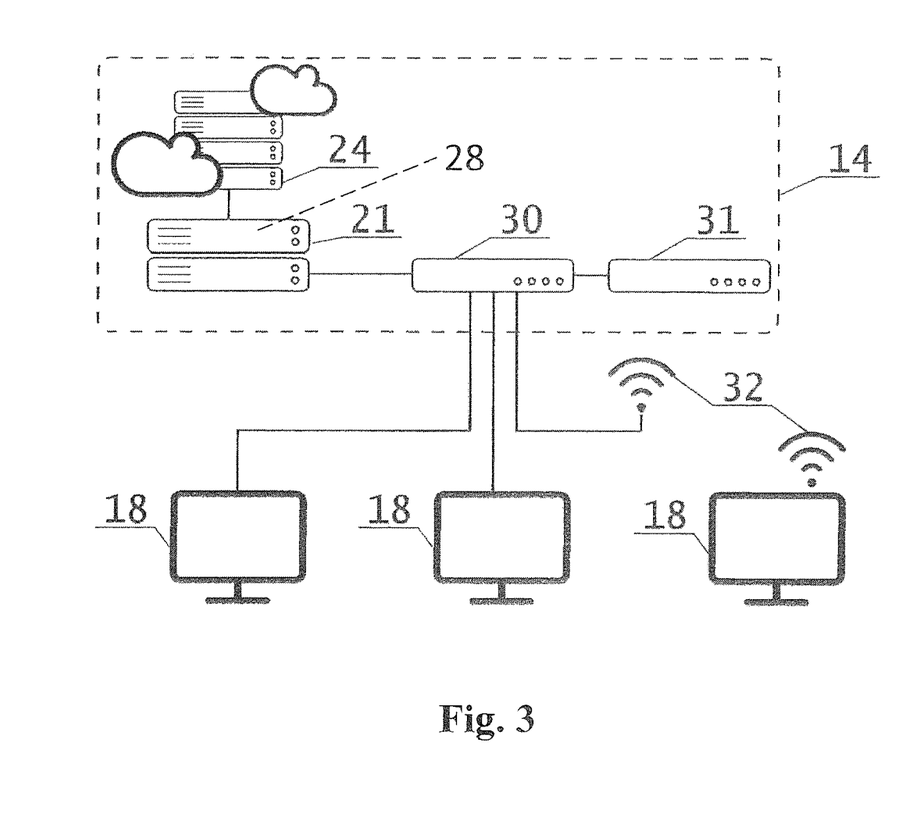
FIG. 3 is a schematic overview showing a third exemplary embodiment which comprises a routing unit.

A further embodiment is depicted in FIG. 3. In the embodiment of FIG. 3 the TDS 14 comprises a routing unit 30 and a network middleware unit 31. The routing unit 30 is a specially configured network routing device. The TV devices 18 are connected to the routing unit by Ethernet connections (solid lines) or by a wireless network connection 32. The routing unit 30, in turn, is connected to control unit 21 and further to central server 24. The network traffic between the TV devices 18 and the control unit 21 and/or central server 24 flows through the routing unit 30. Routing unit 30 may inspect the network traffic and on behalf of the control unit 21 and/or central server collect ip addresses, mac addresses, spoof DNS records, rewrite destination ips or provide VPN services.

The routing unit 30 comprises an open API, either running DD-WRT® or Mikrotik®. The routing unit 30 is configured to automatically provide the TDHL 15 (not shown) to the interactive application running on the TV devices 18, thus making the manual developer effort unnecessary.

Figure 4:
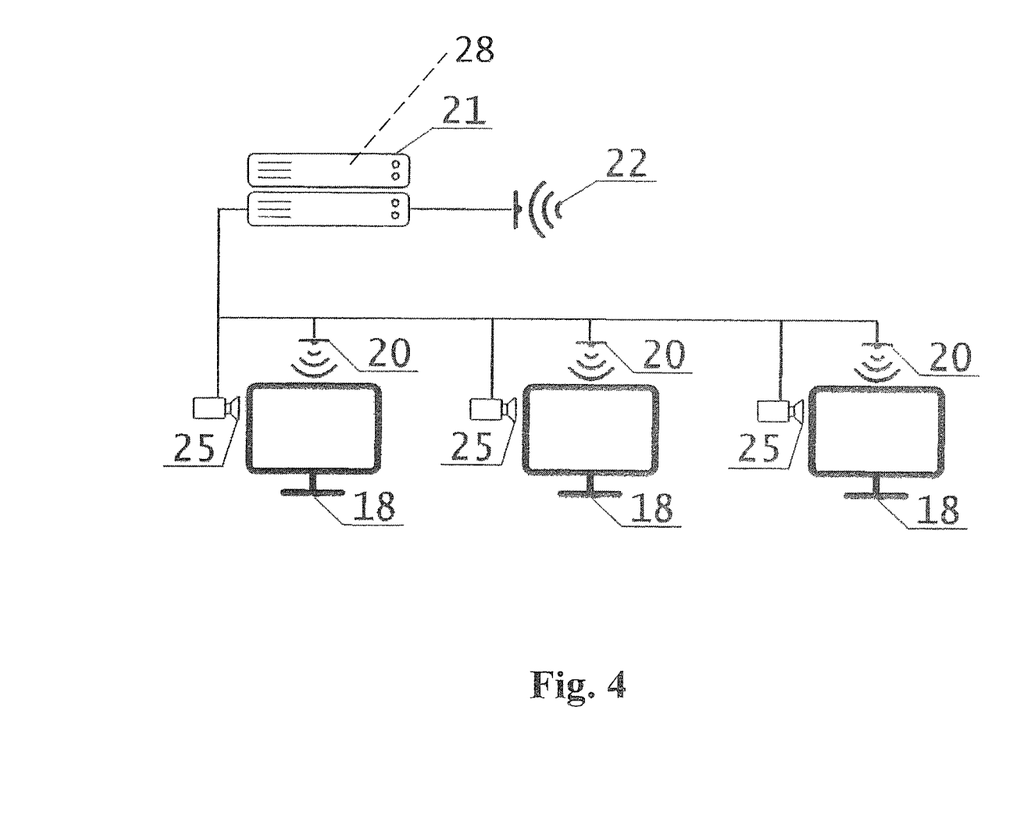
FIG. 4 is a schematic overview illustrating some elements of another embodiment comprising image capture units.

Furthermore, the TDS 14 of the embodiment of FIG. 4 comprises a network middleware unit 31. The network middleware unit 31 is used as a complement to the routing unit 30, however, in other embodiments the network middleware unit 31 may also be used as an alternative to routing unit 30. The network middleware unit 31 comprises a special software which allows for at least partial traffic interception and inspection. The network middleware unit provides predefined versions of network resources requested by the interactive TV application. The implementation method is as follows:

Inside the GUI 13 (not shown) a user will specify the URL of the application to be tested, additionally he will indicate, that the network middleware unit should be deployed when testing this application. In such a case, the central server 24 will negotiate with the network middleware unit 31 a map of network addresses. For the sake of example, consider an app that runs on the domain example.com and uses resources from a.example.com and b.example.com. Furthermore, suppose that domains *.invention.tld are set to resolve to the IP address of the same network middleware unit 31.

Thus upon request from the central server 24 the network middleware unit 31 can create the following map for these example domains:
example.com x.invention.tld
a.example.com y.x.invention.tld
b.a.example.com z.y.x.invention.tld The central server 24 will govern itself by the above table. When starting the test of example.com it will instruct the TV device to open the corresponding domain from the mapping above, in this case x.invention.tld. Since the central server 24 resolves to the network middleware unit 31, the request will arrive there. The network middleware unit 31 will recognize the x.invention.tld as the one generated by itself and will perform a network request to example.com—the corresponding domain in the map in order to fetch the data from that resource. After retrieving the data it will replace all occurrences of example.com with x.invention.tld inside the data. It will furthermore perform replacement according to the table above.

It will be appreciated by a person skilled in the art, that this approach will result in a resource of example.com and all related and linked to resources to be transmitted to the TV device with an alias of x.invention.tld (or according to the mapping described in the table).

FIG. 4 shows several elements of a further embodiment of the present invention. An executive unit 20 is provided for each of TV devices 18. The executive units 20 are connected to the control unit 21. Furthermore a learning unit 22 is connected with the control unit 21.

In contrast to the embodiment of FIG. 1, the embodiment of FIG. 3 comprises several image capture units 25, each of which is dedicated to a TV device 18. The image capture units 25 are camera devices installed in way that allows filming the screen of the TV devices 18. The image capture units 25 transmit the captured image data back to the control unit 21, which further sends the captured image data to central server 24 (not shown). The control unit 21 or central server 24 assigns the captured images to the results of the test currently in progress. Generally, no image recognition is performed nor is any data mined from the image data by the present invention. The images purely serve for the purposes of illustrating a test cycle. In other embodiments, however, the image data may be used as an additional source of information on the state of the interactive application and/or the at least one TV device. This means that in addition to the information obtained by the TDHL of the present invention, further information may be obtained by image recognition or other kind of data mining performed on the image data.

Some embodiments may also support capturing the image from devices without a screen, such as Set-Top-Boxes.

Some or all elements of the exemplary embodiment can be combined to a single electronic device, for cheaper or easier installation.

For example control unit 21 and executive unit 20 can be combined, for instance by combining an infrared emitter with a Raspberry Pi® used as a control unit 21. Learning unit 22 and executive unit 20 can be combined. In this case they share the same microcontroller and communication protocols, and the combined device can have sensors as well as emitters. The routing unit 30 can be integrated into control unit 21, if the control unit 21 has more than one network interface. Image capture unit 25 can also be integrated into control unit 21, for instance, if the control unit 21 is a notebook with a webcam pointed to the testing device.

The invention claimed is:

1. A method for testing interactive application on at least one television (TV) device according to at least one test scenario, wherein the at least one test scenario is run and monitored by a test driver system separate from the at least one TV device, wherein the at least one test scenario comprises a series of user interaction steps and at least one target state of the interactive application or the at least one TV device to be achieved after a specified user interaction step, the method comprising the steps of:
   a. integrating a test definition helper library (TDHL) into the interactive application, wherein the test definition helper library is configured to obtain information on a state of the interactive application or the at least one TV device, wherein the interactive application is modified by the integrating of the test definition helper library into the interactive application to provide a modified interactive application;
   b. providing the modified interactive application to the at least one TV device;
   c. running the at least one test scenario, wherein the test driver system non-transparently performs the series of user interaction steps on the at least one TV device, wherein the user interaction steps non-transparently performed by the test driver system are undistinguishable from corresponding user interaction steps generated by an end-user of the TV device;
   d. obtaining information on the state of the interactive application or the at least one TV device by the TDHL, wherein the information comprises information on runtime objects of the interactive application; and
   e. comparing the information on the state of the interactive application or the at least one TV device obtained by the test definition helper library with the at least one target state after the specified user interaction step;
   wherein the information obtained by the test definition helper library is transmitted to the test driver system, wherein comparing the information on the state of the interactive application or the at least one TV device obtained by the test definition helper library with the at least one target state after the specified user interaction step is performed by the test driver system, and wherein the interactive application is a Smart TV application or a broadcast application.

2. The method according to claim 1, characterized in that the information on the state of the interactive application or the at least one TV device obtained by the test definition helper library comprises at least one of the following:
- a TV device identification value,
- information on view objects of the interactive application,
- information on data traffic caused by the interactive application,
- console output of the interactive application,
- operating system runtime changes, and
- shared memory status.

3. The method according to claim 1, characterized in that the test driver system is configured to translate the user interaction steps of the at least one test scenario into user input signals adapted to each of the at least one TV device.

4. The method according to claim 1, characterized in that the test driver system automatically installs the modified interactive application on the at least one TV device.

5. The method according to claim 4, characterized in that the interactive application is a broadcast application, wherein the test driver system provides the at least one TV device with a television signal, wherein the providing of the modified interactive application to the at least one TV device is provided by the television signal.

6. The method according to claim 1, characterized in that the test driver system is configured for non-transparently performing the series of user interaction steps on the at least one TV device, wherein the test driver system comprises at least one of an infrared emitter, a wireless radio wave transmitter and a network connection module.

7. The method according to claim 1, characterized in that the test driver system is configured to intercept network traffic of the at least one TV device to provide predefined versions of network resources requested by the interactive TV application.

8. The method according to claim 1, wherein the method uses a reference TV device and comprises the following steps:
a. integrating a test definition helper library into the interactive application, wherein the test definition helper library is configured to obtain information on the state of the interactive application or the reference TV device;
b. providing the modified interactive application to the reference TV device;
c. providing a manual user input signal to the reference TV device, wherein the test definition helper library or the test driver system is configured to monitor the manual user input signal;
d. monitoring the information on the state of the interactive application or the reference TV device subsequent to the manual user input signal provided in step (c);
e. defining a specified user interaction step and a corresponding target state of a test scenario, wherein the specified user interaction step is based on the monitored manual user input signal and wherein the target state is based on the monitored state of the interactive application or the reference TV device obtained in step (d).

9. The method according to claim 1, characterized in that the information on the state of the interactive application or the at least one TV device obtained by the test definition helper library comprises at least one of the following:
- a TV device identification value,
- information on runtime objects of the interactive application,
- information on view objects of the interactive application,
- information on data traffic caused by the interactive application,
- console output of the interactive application,
- operating system runtime changes and
- shared memory status.

10. The method according to claim 1, characterized in that the test driver system comprises a translation module to translate the user interaction steps of the at least one test scenario into user input signals adapted to each of the at least one TV device.

11. The method according to claim 1, characterized in that the test driver system automatically installs the modified interactive application on the at least one TV device.

12. The method according to claim 1, further comprising a step of producing a test result based upon the comparison in step (d).

13. A test system for testing an interactive application on a television (TV) device according to at least one test scenario, said test system comprising a test driver system and at least one TV device,
wherein the at least one TV device comprises the interactive application, a test definition helper library (TDHL) is integrated into the interactive application, the test definition helper library is configured to obtain information on a state of the interactive application or the at least one TV device, wherein the interactive application is modified by the integrating of the test definition helper library into the interactive application to provide a modified interactive application, wherein the modified interactive application is configured to be provided to the at least one TV device, said information comprising information on runtime objects of the interactive application;
wherein the test driver system is adapted to run the at least one test scenario by non-transparently performing a series of user interaction steps on the at least one TV device, wherein the user interaction steps non-transparently performed by the test driver system are undistinguishable from corresponding user interaction steps generated by an end-user of the TV device;
wherein the test system is furthermore adapted to compare the information on the state of the interactive application or the at least one TV device obtained by the test definition helper library with at least one target state after a specified user interaction step to produce a test result,
wherein the information obtained by the test definition helper library is transmitted to the test driver system,
wherein compare the information on the state of the interactive application or the at least one TV device obtained by the test definition helper library with at least one target state after a specified user interaction step to produce a test result is performed by the test driver system, and
wherein the interactive application is a SmartTV application or a broadcast application.

14. The test system according to claim 13, characterized in that the test driver system is adapted to carry out the comparison of the information on the state of the interactive application or the at least one TV device.

15. The test system according to claim 13, characterized in that the test driver system is configured to translate the user interaction steps of the at least one test scenario into user input signals adapted to each of the at least one TV device.

16. The test system according to claim 13, characterized in that the test driver system is configured to emit a user input signal adapted to each of the at least one TV device, wherein the test driver system comprises at least one of an infrared emitter, a wireless radio wave transmitter, and a network connection module.

17. The test system according to claim 13, characterized in that the test driver system is configured to receive a manual user input signal adapted to the at least one TV device, wherein the test driver system comprises a conversion module configured to convert the manual user input signal into a user interaction step of the test scenario.

18. The test system according to claim 13, characterized in that the test driver system is configured to automatically install the modified interactive application on the at least one TV device, wherein the interactive application is a broadcast application, wherein the test driver system provides the at least one TV device with a television signal, wherein the television signal provides the modified interactive application to the at least one TV device when the modified interactive application is provided.

19. An apparatus configured for testing interactive application on at least one television (TV) device according to at least one test scenario, wherein the at least one test scenario is run and monitored by a test driver system separate from the at least one TV device, wherein the at least one test scenario comprises a series of user interaction steps and at least one target state of the application or the at least one TV device to be achieved after a specified user interaction step, the apparatus comprising:
  at least one processor; and
  at least one memory including computer program code the at least one memory and the computer program code configured to, with the at least one processor, cause the apparatus to perform at least the following:
  a. integrate a test definition helper library (TDHL) into the interactive application, wherein the test definition helper library is configured to obtain information on a state of the interactive application or the at least one TV device, wherein the interactive application is modified by the integrating of the test definition helper library into the interactive application to provide a modified interactive application;
  b. provide the modified interactive application to the at least one TV device;
  c. run the at least one test scenario, wherein the test driver system non-transparently performs the series of user interaction steps on the at least one TV device;
  d. obtain information on the state of the interactive application or the at least one TV device by the TDHL, wherein the information comprises information on run-time objects of the interactive application, network traffic caused by the interactive application, and console output of the interactive application; and
  e. compare the information on the state of the interactive application or the at least one TV device obtained by the test definition helper library with the at least one target state after the specified user interaction step.

* * * * *